United States Patent
Chiang et al.

[11] Patent Number: 6,144,701
[45] Date of Patent: Nov. 7, 2000

[54] STEREOSCOPIC VIDEO CODING AND DECODING APPARATUS AND METHOD

[75] Inventors: Tihao Chiang, Plainsboro; Ya-Qin Zhang, Cranbury, both of N.J.

[73] Assignee: Sarnoff Corporation, Princeton, N.J.

[21] Appl. No.: 08/948,541

[22] Filed: Oct. 10, 1997

Related U.S. Application Data

[60] Provisional application No. 60/027,934, Oct. 11, 1996.

[51] Int. Cl.[7] ........................... H04N 13/00; H04N 13/02
[52] U.S. Cl. ................... 375/240; 348/43; 348/46
[58] Field of Search ................... 348/42, 43, 46; 375/240

[56] References Cited

U.S. PATENT DOCUMENTS

| | | | |
|---|---|---|---|
| 4,835,688 | 5/1989 | Kimura | 364/413.22 |
| 5,090,038 | 2/1992 | Asahina | 378/41 |
| 5,179,441 | 1/1993 | Anderson | 348/43 |
| 5,557,527 | 9/1996 | Kotaki et al. | 364/470.02 |
| 5,559,728 | 9/1996 | Kowalski et al. | 364/571.02 |
| 5,619,256 | 4/1997 | Haskell | 348/43 |
| 5,652,616 | 7/1997 | Chen et al. | 348/43 |
| 5,682,171 | 10/1997 | Yokoi | 345/7 |
| 5,696,551 | 12/1997 | Katto | 348/43 |

*Primary Examiner*—Howard Britton
*Attorney, Agent, or Firm*—William J. Burke

[57] ABSTRACT

An apparatus and method that applies an affine transformation to achieve steroscopic coding of video.

6 Claims, 3 Drawing Sheets

STEREOSCOPIC VIDEO CODING AND DECODING APPARATUS AND METHOD

This application claims the benefit of U.S. Provisional Application Ser. No. 60/027,934 filed Oct. 11, 1996.

The present invention relates to an apparatus and concomitant method for encoding and decoding digital video. More particularly, this invention relates to an apparatus and method that applies an affine transformation to achieve steroscopic coding of video.

BACKGROUND OF THE INVENTION

With the recent advances in video compression methods, standardization efforts, and VLSI implementations, stereoscopic digital video coding has received much attention. There are several applications that have been associated with stereoscopic video. For example, it is common in computer vision to estimate 3-D motion and shape information based on a stereoscopic source. Stereoscopic image representation is also advantageous for robot remote guidance. For medical imaging, it is desirable to have a stereoscopic presentation of the depth information using CT (Computed Tomography) and MRI (Magnetic Resonance Imaging). In Europe the DISTIMA (Digital Stereoscopic Imaging & Applications) project is currently investigating a compatible transmission of stereoscopic video based on satellite broadcast. International Organization for Standardization, "Report of the ad hoc group on MPEG-2 applications for multi-viewpoint pictures", ISO/IEC JTC/SC29/WG11 No. 861 March, 1995. Stereoscopic RADAR imaging also has been found to be an important application.

In view of the importance of the stereoscopic video applications, the Motion Pictures Experts group (MPEG) committee decided to form an ad hoc group to define a new profile which is referred to as Multiview Profile (MVP). International Organization for Standardization, "Status Report on the study of Multi-viewpoint pictures", ISO/IEC JTC/SC29/WG11 No. 906 March, 1995. The goal is to provide a compression scheme with multiple viewpoint capability while maintaining a backward compatibility with the current monoview MPEG compression scheme.

SUMMARY OF THE INVENTION

The present invention applies an affine transformation to achieve steroscopic coding of video.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
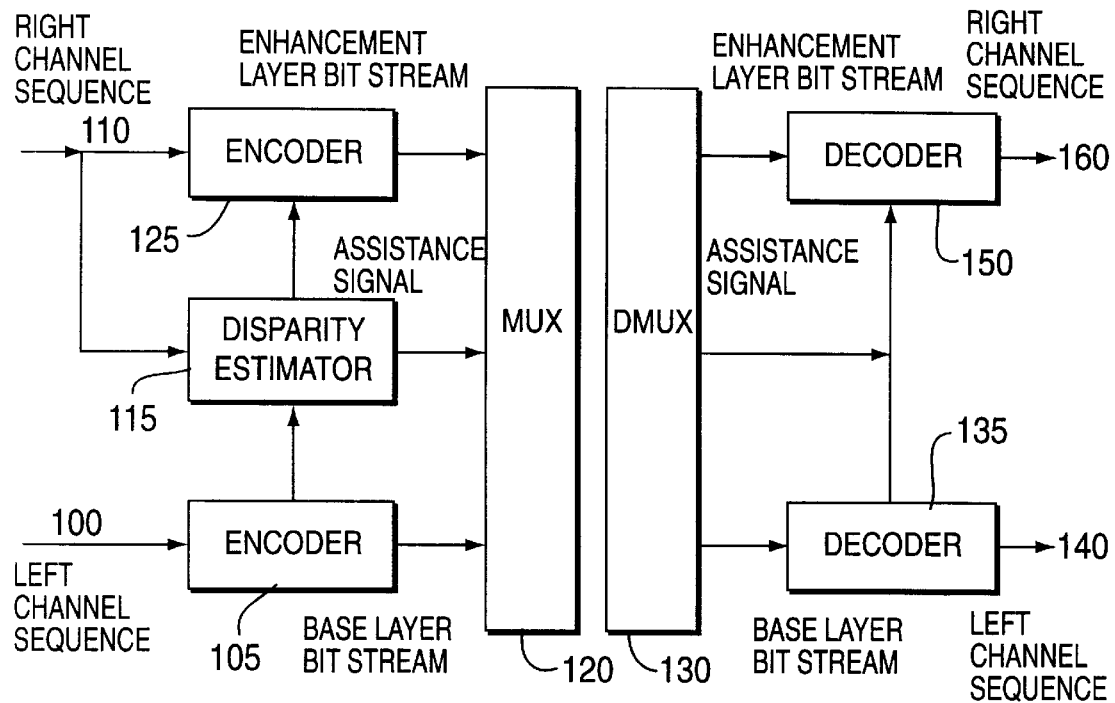
FIG. 1 is a block diagram for stereoscopic video coding using disparity analysis.

A commonly used approach for stereoscopic video coding involves an analysis of disparity and motion and is illustrated in FIG. 1. The syntax for encoding is based on the temporal scalable profile syntax in MPEG-2.

A stereoscopic video sequence is composed of two video sequences; one representing the left channel 100 and the other representing the right channel 110. Frames from each channel simultaneously are captured and have different viewing angles. Therefore, there is an inherent redundancy between the two channels since they represent snapshots of the same object at the same instant of time with different perspectives. Thus, we use a scalable approach to represent a stereoscopic video sequence in a layered structure. The base layer encoder 105 compresses only the left channel. The encoded left channel sequence, which is comprised of a series of image frames, is input to multiplexer (MUX) 120 as a base layer bit stream. Encoding typically includes discrete cosine transforming (DCT), quantization and run-length coding (RLC). Each encoded left channel image also is decoded by encoder 105 and the decoded bit stream is applied to disparity estimator 115. Right video sequence 110, which also is comprised of a series of images, also is input to disparity estimator 115. Disparity estimator 115 searches a left channel decoded image input to disparity estimator 115 by left channel encoder 105 for blocks in the decoded left channel image which are a match for blocks in the corresponding right channel image. Disparity estimator 115 generates disparity vectors which define the relative displacement or disparity between the blocks in the right channel image and the matching blocks in the left channel image. Disparity estimator 115 inputs to right channel encoder 125 the disparity vectors, and the left channel decoded image. Encoder 125 generates a disparity compensated reference image by applying the disparity vectors to the decoded left channel image. The encoder subtracts the disparity compensated left channel image from the right channel image to obtain a difference or residual image. Encoder 125 encodes and transmits the residual image and the disparity vectors ("the assistance signal"). The encoding typically includes DCT, quantization and RLC. In an alternate embodiment, the disparity estimator generates the disparity compensated and difference images.

On the receiver side, demultiplexer (DMUX) 130 receives the encoded left channel image and applies it to left channel decoder 135. Left channel decoder 135 outputs a decoded left channel image, a series of which define decoded left channel sequence 140. The decoded left channel sequence also is input to decoder 150. Decoder 150 receives the encoded disparity vectors (the "assistance signal" from DMUX 130. Decoder 150 decodes the encoded disparity vectors and the residual image. The decoded disparity vectors are applied to the decoded left channel image to provide a disparity compensated left channel image. In a process substantially opposite from the subtraction performed by encoder 125, decoder 150 adds the residual to the disparity compensated left channel image to provide the decoded right channel image, a series of which define right channel sequence 160. Such a layered structure is very desirable in providing services to various users with different display capabilities and bandwidth. For example, scalability can provide compatibility among different spatial resolutions and scanning formats.

In the above approach, the change of viewing angle is considered as a zero time camera movement which is compensated using the disparity analysis. The occlusion is augmented using motion compensation. Such a representation is sufficient for two channels, however, generalization of this approach to multiple channels and viewpoints becomes awkward and inefficient. For example, deformation and foreshortening are not considered. Since a stereoscopic video sequence is available, an estimation of the 3-D motion based on both channels is possible in achieving better prediction models. Using a digital image warping technique of an embodiment of the invention, the movement of perspective points can be included in the estimator. There are embodiments using either affine transformation or quadratic transformation.

Figure 2:
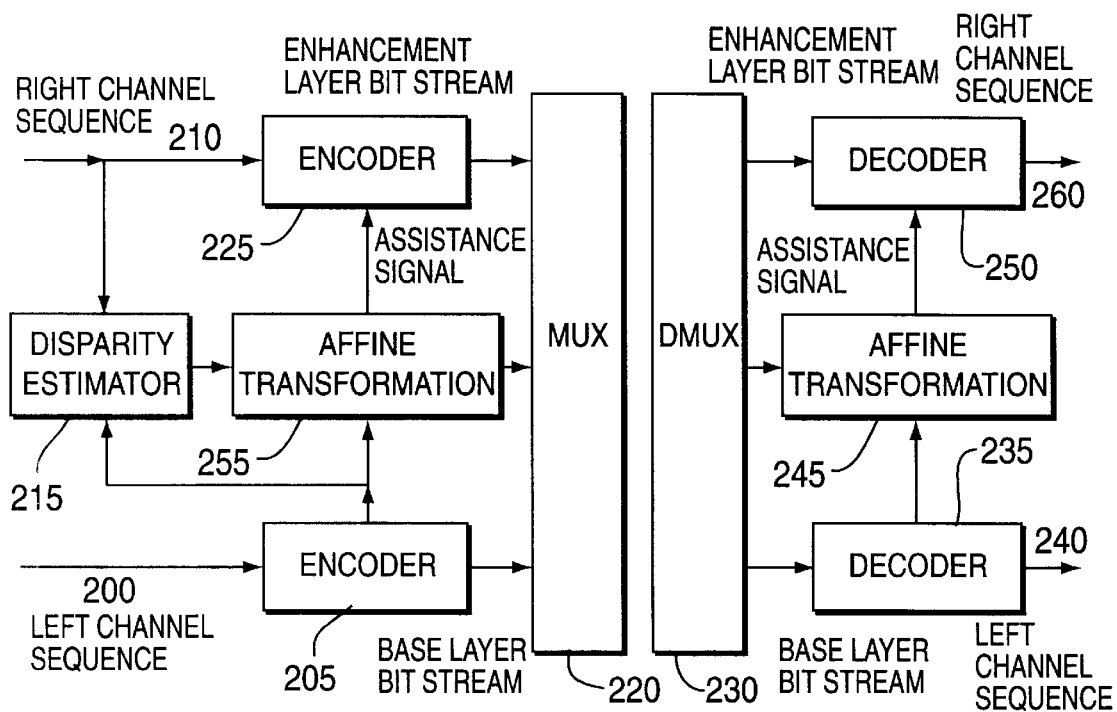
FIG. 2 is a block diagram for stereoscopic video coding using an embodiment of the invention.

FIG. 2 is a block diagram of the stereoscopic encoder and decoder of an embodiment of the invention. The left channel sequence 200, consisting of a series of left channel images, is applied to left channel encoder 205. Typically, encoding comprises discrete cosine transform (DCT), quantization and RLC. The encoded left channel sequence is input to MUX 220.

Decoded images from encoder 205 are applied to disparity estimator 215 and affine transformer 255. Disparity estimator 215 generates a sets of affine parameters, for example, in place of the disparity vectors of the prior art. The affine parameters generated accurately model the apparent change in perspective viewpoint between the left and right images of the stereoscopic sequence.

To generate the affine parameters, the decoded left channel image from left channel sequence 200 which is applied to disparity estimator 215 is compared to an image from right channel sequence 210. More particularly, a non-square four sided block from the left channel image is matched to a square block in the right channel image. Typically, a square left channel block is first obtained for deformation into a non-square four sided block using a block-matching method (BMM).

After selection of the block, deformation into a non-square block can occur along any side(s) and is monitored using the gradient based Gauss-Newton optimization technique. After the deformation concludes, the deformed block, which preferably best matches a selected block in the right image, provides a set of six (6) affine parameters. The six affine parameters define the shape of the block. For each block, the set of affine parameters are applied to affine transformer 255. The affine parameters for each block also are encoded, such as by encoder 225 or within affine transformer 255, and transmitted to MUX 220.

Affine transformer 255 processes the affine parameters for each block to provide a plurality of transformed blocks which together make a transformed image. The transformed image is subtracted from the right channel image to provide a difference or residual image. The subtraction can occur in affine transformer 255 or encoder 225. The residual is encoded by encoder 225, such as by DCT, quantization and RLC compression, and transmitted to MUX 220.

On the receiver side, DEMUX 230 receives encoded left channel images and transmits them to decoder 235. Decoder 235 decodes the left channel images to provide left channel sequence 240.

The assistance signal, i.e., the affine parameters, are received from DMUX 230, decoded, such as by decoder 235, and input to affine transformer 245. A decoded left channel image also is input to affine transformer 245 from decoder 235. Affine transformer 245 includes a processing function comparable to the processing function in affine transformer 255 on the transmitter side. Using the affine parameters, the affine transformer 245 transforms the decoded left channel image input by decoder 235 block-by-block to generate a transformed left channel image. The transformed left channel image can be assembled in affine transformer 245 or in decoder 250. In any event, decoder 250 obtains a transformed left channel image.

Decoder 250 receives the residual from DMUX 230. The residual is decoded by decoder 250 and added to the transformed left channel image to generate a right channel image. One of ordinary skill in the art will see that a repetition of the process described above over sequential image frames will result in the generation of right channel sequence 260.

The embodiment discussed above provides better reproduction of the perspective viewpoint difference between the left and right channels. The encoder manipulates a base layer sequence so that the change of view point is considered.

The formulation of the affine parameters is described below. In a more general case, 12 parameters, a 3×3 matrix to represent rotation and 3×1 vector to represent translation, are required.

For example, in a 3-D space, the change of view points can be modeled as a combination of rotation and translation.

$$\begin{pmatrix} \overline{x} \\ \overline{y} \\ \overline{z} \end{pmatrix} = \begin{pmatrix} r1 & r2 & r3 \\ r4 & r5 & r6 \\ r7 & r8 & r9 \end{pmatrix} \times \begin{pmatrix} x \\ y \\ z \end{pmatrix} + \begin{pmatrix} t1 \\ t2 \\ t3 \end{pmatrix}$$

where the r variables define rotation and the t variable define translation.

The correspondence points are found as $$\overline{X} = \frac{(r1 \times X + r2 \times Y + r3) \times z + t1}{(r7 \times X + r8 \times Y + r9) \times z + t3}, \overline{Y} = \frac{(r4 \times X + r5 \times Y + r6) \times z + t2}{(r7 \times X + r8 \times Y + r9) \times z + t3}$$

X,Y: is the original coordinate
$\overline{X},\overline{Y}$: is the new coordinate
z: is the depth information Such a presentation requires an accurate estimation of the depth information z. If depth information is found, the complete model can be used.

However, the formulation can be reduced to a less sophisticated approach if a certain pattern of the 12 parameters is assumed. Specifically, it can be reduced to affine, perspective transformation under certain conditions, such as by setting r7, r8, t1, t2 and t3 to zero, and r9 to 1. The assumption is that the camera has not moved significantly so that the translation is ignored. This generally is true for the stereoscopic application since the distance between the two cameras is small. The advantage of using affine transformation is that the complexity as compared to the general method is minimal. Thus, the formulation can be reduced to affine as described in the following equation.

$$\begin{pmatrix} \overline{x} \\ \overline{y} \\ \overline{z} \end{pmatrix} = \begin{pmatrix} r1 & r2 & r3 \\ r4 & r5 & r6 \\ 0 & 0 & 1 \end{pmatrix} \times \begin{pmatrix} x \\ y \\ z \end{pmatrix} + \begin{pmatrix} 0 \\ 0 \\ 0 \end{pmatrix}$$

where r1, r2, r4 and r5 are rotation in the image plane and r3, r6 are translation in the image plane (physically manifested as a depth change).

The correspondence relation is:

$$\overline{X} = r1 \times X + r2 \times Y + r3, \overline{Y} = r4 \times X + r5 \times Y + r6$$

which is stored, for example, in affine transformers 255 and 245.

The formulation can be generalized into perspective transformation if t1, t2 and t3 are set to zero. The same formulation is shown with proper setting of parameters.

$$\begin{pmatrix} \overline{x} \\ \overline{y} \\ \overline{z} \end{pmatrix} = \begin{pmatrix} r1 & r2 & r3 \\ r4 & r5 & r6 \\ r7 & r8 & r9 \end{pmatrix} \times \begin{pmatrix} x \\ y \\ z \end{pmatrix} + \begin{pmatrix} 0 \\ 0 \\ 0 \end{pmatrix}$$

The correspondence relation has reduced to $$\overline{X} = \frac{r1 \times X + r2 \times Y + r3}{r7 \times X + r8 \times Y + r9}, \overline{Y} = \frac{r4 \times X + r5 \times Y + r6}{r7 \times X + r8 \times Y + r9}$$

However, the computational load and complexity for the perspective transformation is much higher than that for the affine transformation.

When obtaining the affine parameters, it is important to initially find a good starting point. An iterative gradient based approach can easily diverge if the initial point is not selected correctly. A pyramidal scheme to find a good initial point in estimating the affine parameters is discussed below. If a convergent solution is not found, the estimator will fall back to disparity analysis. Thus, we can assure that the performance can be at least lower bounded by the disparity analysis. An accurate and efficient method to estimate the six affine parameters is described. The method is not limited to affine transformation. In order to reduce the computational complexity, a spatial pyramid preferably is used for the estimation. The pyramidal approach also can prevent the estimation process from trapping into a local minimum or divergence. As discussed above, the approach advantageously combines the concept of block matching method (BMM) and gradient-based Gauss-Newton optimization search. The advantage of such a hybrid approach is that a global minimum can be achieved without much computational complexity.

Both the left image and the right video sequence are first subsampled into four layers which are reduced in resolution by half in both the horizontal and the vertical directions. It should be understood that although the images are sampled into 4 layers, the present invention is not limited to this number of layers. Additional layers can be added or deleted depending on a particular implementation.

Figure 3A:
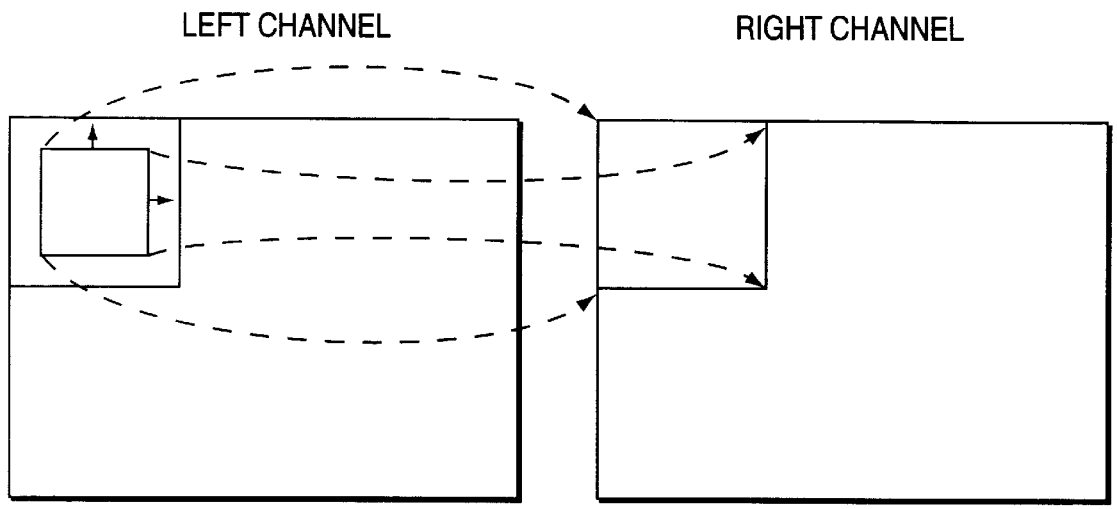
FIGS. 3A and 3B are illustrations of an embodiment for obtaining the affine parameters.

For each layer the estimator follows the steps described below in FIG. 4. The initial point is determined by searching a prescribed area in the left channel image using a block matching method to identify a block which best matches a predetermined block in the right channel image. The best matching block will yield the lowest sum of the squared errors (SSE). A left channel block therefore is found to match the selected right channel block. This will yield a stable initial point to estimate the affine parameters. This process is illustrated in FIG. 3A.

Figure 3B:
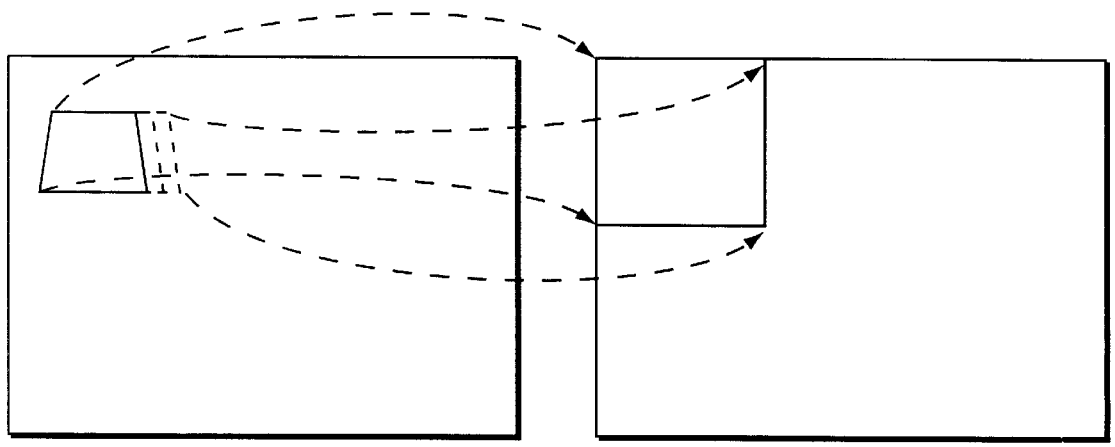
Figure 4:
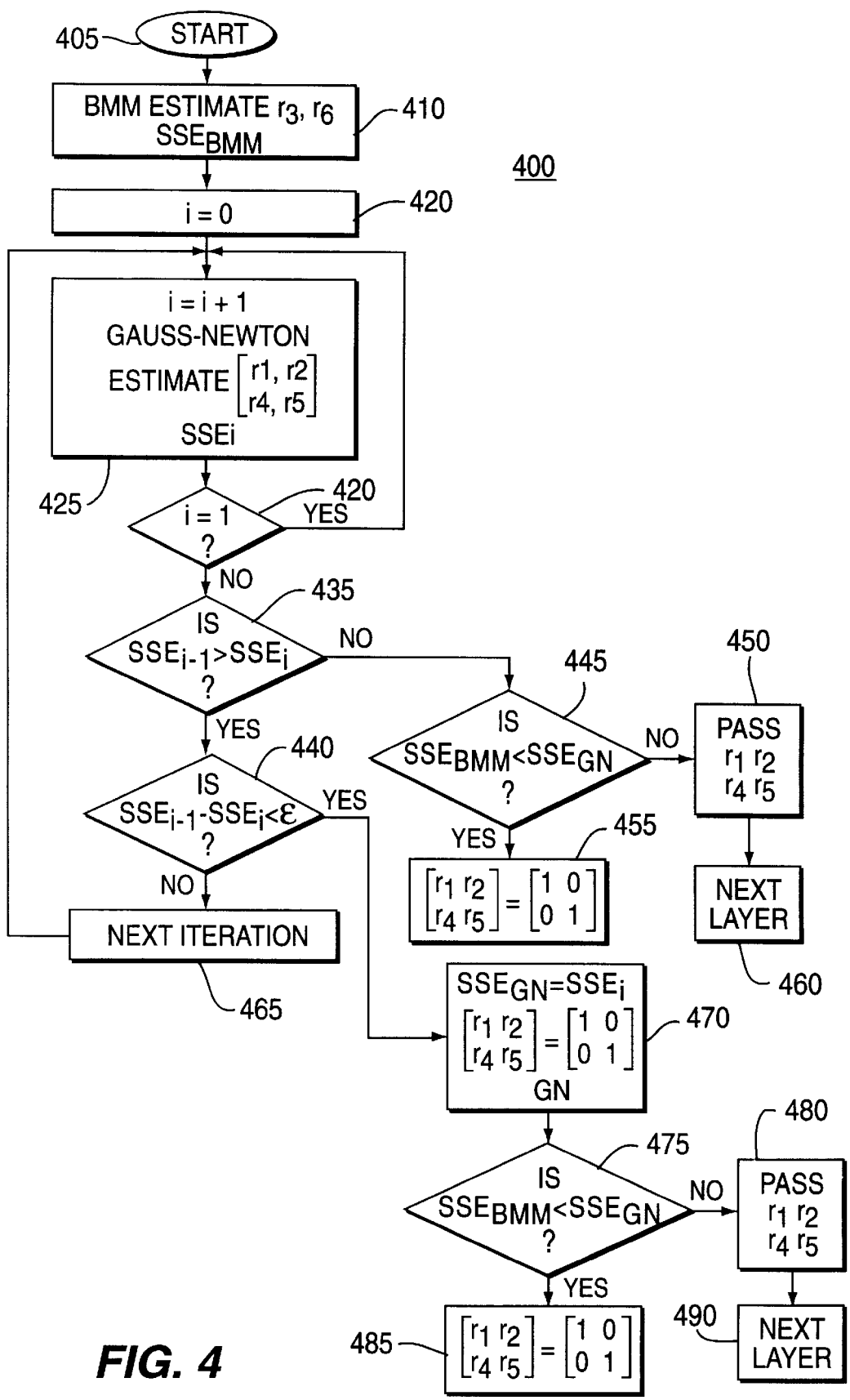
FIG. 4 illustrates a flowchart of a method for estimating the affine parameters.

More specifically, FIG. 4 illustrates a flowchart of a method 400 for estimating the affine parameters. The affine parameters are estimated using the Gauss-Newton optimization method. Namely, based on a previous initial point, the method can find a differential increment to yield new affine parameters, for example by further or differently deforming the starting block to warp the left channel signal toward the right channel signal. This is illustrated in FIG. 3B.

An evaluation of the sum of the square errors (SSE) is performed to determine if the iteration should continue. If a decrease of SSE is observed, another iteration of the Gauss-Newton method is applied. The iteration stops at the point either the SSE is not decreasing significantly or the SSE starts to diverge. In the case of divergence, the parameters can be reset to their value just prior to the diverging iteration. Thus, the estimation of a level of the pyramid is completed. All the information acquired at each layer is passed onto the next layer as the initial starting point for optimization.

The computational load is reduced significantly due to the fact that a pyramidal approach is used. The possibility of finding a useful convergent solution is high. In the case of divergent solution, the estimator can always fall back to the solution obtained using the BMM approach. This is of particular importance when the region of interest is reduced to a much smaller size. In such a case, the Gauss-Newton iteration needs a good initial point, such as when the area size is reduced to the range of 16×16 to 32×32 pixel areas.

Referring to FIG. 4, method 400 starts in step 405 and proceeds to step 410 where blocking matching method is used to estimate the translational parameters r3 and r6, e.g., macroblock by macroblock for the entire frame. Initially, these parameters are set at:

$$\begin{bmatrix} r1 & r2 \\ r4 & r5 \end{bmatrix} = \begin{bmatrix} 1 & 0 \\ 0 & 1 \end{bmatrix} \text{ and } \begin{bmatrix} r3 \\ r6 \end{bmatrix} = \begin{bmatrix} 0 \\ 0 \end{bmatrix}$$

It should be noted that FIG. 4 illustrates a method for estimating the affine parameters for a single layer. Thus, method 400 will be applied to each layer of the spatial pyramid. The sum of the square errors ($SSE_{BMM}$) resulting from the blocking matching method is stored for later use.

In step 420, a counter is initialized. Namely "i" is set equal to zero (0), where i represents the number of iteration of applying the Guass-Newton estimation method.

In step 425, method 400 increments i by 1 and applies the Guass-Newton estimation on $$\begin{bmatrix} r1 & r2 \\ r4 & r5 \end{bmatrix}.$$

The sum of the square errors ($SSE_i$) is calculated and stored.

In step 430, method 400 queries whether i=1. If the query is affirmatively answered, then method 400 returns to step 425 to perform a second estimation. If the query is negatively answered, then method 400 proceeds to step 435.

In step 435, method 400 queries whether $SSE_{i-1}$ is greater than $SSE_i$. If the query is affirmatively answered, then method 400 proceeds to step 440. If the query is negatively answered, then method 400 proceeds to step 445. Namely, the results from the Guass-Newton estimation is diverging and no additional iteration is performed.

In step 445, method 400 queries whether $SSE_{BMM}$ is less than $SSE_{GN}$, where $SSE_{GN}$ is set equal to $SSE_{i-1}$. Namely, the result from Guass-Newton estimation is compared with the block matching method. If the query is affirmatively answered, then method 400 proceeds to step 455, where method set $$\begin{bmatrix} r1 & r2 \\ r4 & r5 \end{bmatrix} = \begin{bmatrix} 1 & 0 \\ 0 & 1 \end{bmatrix}.$$

If the query is negatively answered, then method 400 proceeds to step 450, where the Guass-Newton estimated affine parameters are passed. In step 460, the method proceeds to the next layer.

In step 440, method 400 queries whether $SSE_{i-1} - SSE_i$ is less than a threshold $\epsilon$, which is preferably set at $10^{-4}$. However, other threshold values can be used for different applications. If the query is negatively answered, then method 400 proceeds to step 425, where the Guass-Newton estimation is performed again. If the query is affirmatively answered, then method 400 proceeds to step 470, where $$\begin{bmatrix} r1 & r2 \\ r4 & r5 \end{bmatrix}_{GN} = \begin{bmatrix} 1 & 0 \\ 0 & 1 \end{bmatrix}_i$$

and $SSE_{GN}$ is set equal to $SSE_i$.

In steps 475, 480, 485, and 490, method 400 again compare the result from Guass-Newton estimation is compared with the block matching method. Thus, steps 475, 480, 485, and 490 are identical to those of 445, 450, 455, and 460 respectively. As such, descriptions for steps 475, 480, 485, and 490 are described above.

Experiments have been carried out to compare the estimator based on either disparity analysis of the prior art or a hybrid of both disparity analysis and affine transformation of an embodiment of the invention. The results of the experiments are shown below in Table 2, where the values indicate peak signal-to-noise ratio in dB's. It is observed that the prediction which comes from the left channel is improved by 0.66 dB and 0.77 dB for "manege" and "tunnel" sequences respectively. The maximum number of iterations for the Newton-Gauss method was only 4 for each 16×16 macroblock. Thus, the computational load is minimal. If the estimation of the affine transformation diverges, the estimator will observe that using the mean square error measure and fall back to the disparity analysis mode. Thus, the prediction performance is lower bounded by the performance of the disparity analysis approach.

|  | Disparity Analysis | | | Disparity Analysis & Affine Transformation | | |
|---|---|---|---|---|---|---|
|  | Y | U | V | Y | U | V |
| Manege | 22.80 | 33.07 | 33.95 | 23.46(+0.66) | 33.17(+0.10) | 33.95(+0.00) |
| Tunnel | 27.41 | 35.43 | 32.78 | 28.18(+0.77) | 35.65(+0.22) | 32.88(0.10) |

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that various changes in the details, materials and arrangements of the parts which have been described and illustrated in order to explain the nature of this invention may be made by those skilled in the art without departing from the principle and scope of the invention.

What is claimed is:

1. An stereoscopic encoder, comprising:

a first encoder for receiving a first channel of images;

a second encoder for receiving a second channel of images;

a disparity estimator, coupled to said first and second encoders, for generating affine parameters; and an affine transformer, coupled to said disparity estimator, for generating transformed images.

2. The stereoscopic encoder of claim 1, wherein each of said transformed images is subtracted with each of said images from said first channel to form a residual image.

3. The stereoscopic encoder of claim 1, wherein said one channel is a right channel and said second channel is a left channel.

4. The stereoscopic encoder of claim 1, wherein said affine parameters are generated using Guass Newton estimation.

5. An stereoscopic decoder, comprising:

a first decoder for receiving a first channel of encoded residual images;

a second decoder for decoding a second channel of encoded images; and an affine transformer, coupled to said decoders, for generating decoded transformed images.

6. A method for encoding two channels of images, said method comprising the steps of:

(a) receiving a first channel of images by a first decoder;

(b) receiving a second channel of images by a second;

(c) generating affine parameters by using images from said decoders; and (d) using an affine transformer to generate transformed images.

\* \* \* \* \*